May 19, 1931.   G. V. COLLINS   1,805,480
CHECK VALVE FOR VOLATILE LIQUIDS
Filed Aug. 1, 1927

Inventor
Gordon V. Collins
H. J. S. Dennison
Attorney

Patented May 19, 1931

1,805,480

UNITED STATES PATENT OFFICE

GORDON V. COLLINS, OF HAMILTON, ONTARIO, CANADA, ASSIGNOR TO JOHN K. RICHARDSON, OF ST. MARY'S, ONTARIO, CANADA

CHECK VALVE FOR VOLATILE LIQUIDS

Application filed August 1, 1927. Serial No. 209,964.

The principal object of this invention is to overcome the difficulties met with in retaining volatile liquids in a stand pipe leading to a pump, such as is commonly found in the present day gasolene distributing pumps and to provide a very simple and inexpensive form of valve which will hold such liquids securely.

The principal feature of the invention consists in a novel use of the resilient composition material as a seat for the valve, which composition is not deleteriously affected by gasolene or oils but which is sufficiently resilient to make fluid tight contact with the valve.

Figure 1:
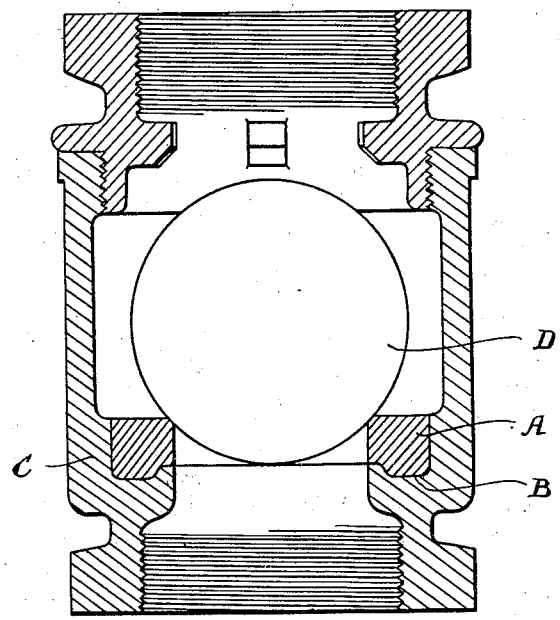

In the accompanying drawings, Figure 1 is a longitudinal sectional view of a ball check valve in which my invention is embodied.

Figure 2:
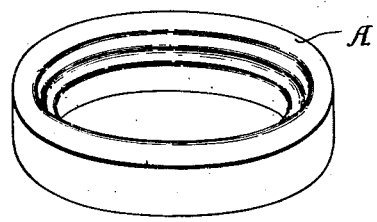

Figure 2 is a perspective detail of the valve seat removed.

The present invention is extremely simple, in that it consists entirely in the novel use of a certain composition of material for the seat of the ball valve.

In the very extensive use of gasolene pumps it has been a very vexatious problem to overcome the difficulty of leakage of the gasolene in the pipe leading from the supply tank to the pump and very large, heavy, expensive valves have been produced with special ground faces in an endeavour to overcome the difficulty.

The applicant has overcome the difficulty in a most extraordinary manner by simply utilizing as a seat for the valve a gasket or washer of a very common and well known material which is an elastic or resilient composition usually formed of a mixture of glue, glycerine and molasses or sugar and is known as printer's inking roller "Compo", the ingredients preferred being approximately 10 parts glue, 20 to 30 parts glycerine and 10 parts of molasses, though it must be understood that these proportions vary in accordance with local conditions of use, particularly in regard to the temperature under which the valve will normally be acting. This material is quite elastic and a valve will seat itself in this material, making a perfectly fluid tight joint but the material is of such a nature that it is not susceptible to attacks by a gasoline, mineral oils or all or any of the derivatives thereof, in fact, it is usually preserved and kept from drying out, shrinking or cracking by being coated with grease when not in use.

A valve seat constructed of such material will not swell nor stick to the valve. It will not become soft or spongy, nor will it disintegrate under the action of constant contact with gasolene or such like fluids.

The valve seat is preferably moulded in the form of a ring A to fit into the seat B of the valve body C.

The valve, which is here shown in the form of a ball D, rests upon the inner peripheral edge of the ring and forms a contact seat therewith.

It may be found desirable to mould the ring A with a tapered or concaved seat to give a better bearing surface against the valve but a valve constructed as herein shown has been tested and found to hold the lightest kind of fluid under heavy head without leakage of any kind.

What I claim as my invention is:

1. A valve having a soft, resilient seat formed of a congealed composition of materials and being impervious to the action of gasoline or mineral oils.

2. A soft resilient valve seat formed of congealed fluid or semi-fluid material impervious to the action of gasoline or mineral oils and moulded to the desired shape and adapted to be inserted in a valve body.

3. A valve seat formed of a mixture of glue, glycerine and molasses moulded to the desired form and presenting a tough, yielding seat for the valve impervious to gasoline and mineral oils.

4. A soft resilient valve seat formed of a composition soluble in water and impervious to the action of gasolene or mineral oils.

5. A soft resilient valve seat adapted to resist the action of gasoline or mineral oils and formed of a composition containing glue and molasses.

6. A soft resilient valve seat adapted to resist the action of gasoline or mineral oils and formed of a composition containing glue and glycerine.

GORDON V. COLLINS.